(12) United States Patent
Naughton

(10) Patent No.: US 12,527,681 B2
(45) Date of Patent: Jan. 20, 2026

(54) MEDICAL DEVICE ASSEMBLIES INCLUDING A VALVED DRAINAGE MEMBER

(71) Applicant: Hollister Incorporated, Libertyville, IL (US)

(72) Inventor: Vincent Naughton, Sligo (IE)

(73) Assignee: Hollister Incorporated, Libertyville, IL (US)

(*) Notice: Subject to any disclaimer, the term of this patent is extended or adjusted under 35 U.S.C. 154(b) by 405 days.

(21) Appl. No.: 18/006,314

(22) PCT Filed: Jul. 20, 2021

(86) PCT No.: PCT/US2021/042298
§ 371 (c)(1),
(2) Date: Jan. 20, 2023

(87) PCT Pub. No.: WO2022/020303
PCT Pub. Date: Jan. 27, 2022

(65) Prior Publication Data
US 2023/0293334 A1    Sep. 21, 2023

Related U.S. Application Data

(60) Provisional application No. 63/056,284, filed on Jul. 24, 2020.

(51) Int. Cl.
*A61M 25/00* (2006.01)
*A61F 5/44* (2006.01)
*A61M 39/24* (2006.01)

(52) U.S. Cl.
CPC ....... *A61F 5/4405* (2013.01); *A61M 25/0017* (2013.01); *A61M 2039/244* (2013.01)

(58) Field of Classification Search
CPC .......... A61F 5/4405; A61F 5/44; A61F 5/441; A61F 5/445; A61M 25/0017;
(Continued)

(56) References Cited

U.S. PATENT DOCUMENTS 3,586,041 A    6/1971  Monestere
3,814,124 A *  6/1974  Bell .................... F16K 15/16
                                                    137/454.2
(Continued)

FOREIGN PATENT DOCUMENTS

DE    2442628 A1 *  3/1975
DK    586388 A       4/1990
(Continued)

OTHER PUBLICATIONS

International Search Report and Written Opinion for PCT/US2021/042298 Dated Oct. 20, 2021.
(Continued)

*Primary Examiner* — Adam Marcetich
(74) *Attorney, Agent, or Firm* — Cook Alex Ltd.

(57) ABSTRACT

A medical device assembly comprises a drainage member having a proximal end, a distal end, and a body defining a lumen extending therebetween. The lumen is in fluid communication with a medical device at the proximal end. The lumen is also in fluid communication with a collection container at the distal end. The drainage member body is attached to the collection container. The body includes a valve configured to control fluid flow between the drainage member and the collection container.

19 Claims, 5 Drawing Sheets

(58) Field of Classification Search
CPC .. A61M 2039/244; A61M 1/69; A61M 39/24; A61M 2202/0496; A61M 1/604; A61M 1/62; F16K 15/20; F16K 15/202; F16K 15/205; F16K 15/1402; F16K 15/14; F16K 15/03; F16K 15/031; F16K 15/1472; A61J 1/10; A61J 15/0092; A61J 1/1431

See application file for complete search history.

(56) References Cited

U.S. PATENT DOCUMENTS

| | | | | |
|---|---|---|---|---|
| 3,901,235 | A * | 8/1975 | Patel | A61F 5/4405 604/350 |
| 3,928,875 | A | 12/1975 | Persson | |
| 3,941,149 | A * | 3/1976 | Mittleman | A61M 39/24 137/493.1 |
| 3,967,645 | A * | 7/1976 | Gregory | F16K 15/147 604/323 |
| 3,968,925 | A * | 7/1976 | Johnston | F16K 15/144 604/323 |
| 4,084,606 | A * | 4/1978 | Mittleman | F16K 15/1402 137/854 |
| 4,158,362 | A | 6/1979 | Durrett et al. | |
| 4,179,051 | A * | 12/1979 | Thomas | A61M 3/0262 137/454.2 |
| 4,188,989 | A * | 2/1980 | Andersen | A61F 5/44 600/580 |
| 4,205,690 | A | 6/1980 | Layton | |
| 4,421,509 | A * | 12/1983 | Schneider | A61F 5/4408 604/327 |
| 4,512,770 | A * | 4/1985 | Cianci | A61F 5/4405 604/350 |
| 4,723,944 | A * | 2/1988 | Jensen | A61F 5/4404 383/44 |
| 4,723,950 | A * | 2/1988 | Lee | A61M 1/882 604/326 |
| 4,725,268 | A | 2/1988 | Ostensen et al. | |
| 4,828,554 | A * | 5/1989 | Griffin | A61F 5/4405 604/326 |
| 4,938,747 | A * | 7/1990 | Wallace | A61F 5/44 604/323 |
| 4,946,451 | A * | 8/1990 | Cianci | A61F 5/4404 604/350 |
| 4,990,145 | A | 2/1991 | Fleury | |
| 5,067,821 | A | 11/1991 | Young | |
| 5,087,251 | A * | 2/1992 | Heyman | A61F 5/44 604/327 |
| 5,116,139 | A | 5/1992 | Young et al. | |
| 5,343,889 | A * | 9/1994 | Jaw | F16K 15/205 137/232 |
| 5,356,398 | A | 10/1994 | Willis | |
| 5,429,620 | A | 7/1995 | Davis | |
| 5,924,452 | A * | 7/1999 | Szpara | F16K 15/147 137/844 |
| 6,176,758 | B1 * | 1/2001 | Wu | A63H 27/10 446/224 |
| 7,008,407 | B1 * | 3/2006 | Kamp | A61F 5/4405 604/327 |
| 7,410,481 | B1 | 8/2008 | Mitts et al. | |
| 7,837,661 | B2 | 11/2010 | Kaern et al. | |
| 7,896,857 | B2 | 3/2011 | Kay et al. | |
| 9,693,889 | B2 | 7/2017 | Schertiger | |
| 9,918,869 | B2 | 3/2018 | Henry et al. | |
| 10,016,299 | B2 | 7/2018 | Pierson | |
| 2003/0029885 | A1 * | 2/2003 | Kawolics | B65D 77/067 222/105 |
| 2004/0064112 | A1 | 4/2004 | Sun | |
| 2006/0079854 | A1 * | 4/2006 | Kay | A61F 5/4405 604/328 |
| 2007/0010792 | A1 * | 1/2007 | Kimura | A61F 5/4556 604/329 |
| 2007/0049879 | A1 | 3/2007 | Gutierrez | |
| 2007/0057222 | A1 * | 3/2007 | Iversen | A61F 5/4405 251/324 |
| 2007/0149934 | A1 * | 6/2007 | Christensen | A61F 5/4404 604/326 |
| 2007/0203464 | A1 * | 8/2007 | Green | A61F 5/4405 604/350 |
| 2008/0156376 | A1 * | 7/2008 | Lin | F16K 15/20 137/223 |
| 2009/0082743 | A1 | 3/2009 | Buglino et al. | |
| 2009/0234310 | A1 * | 9/2009 | Marshall | A61F 5/449 604/327 |
| 2012/0116335 | A1 | 5/2012 | Tanghoej | |
| 2013/0245496 | A1 | 9/2013 | Wells et al. | |
| 2013/0338615 | A1 * | 12/2013 | Zeller | A61F 5/441 604/328 |
| 2015/0190272 | A1 * | 7/2015 | Chang | A61F 5/445 604/335 |
| 2016/0302960 | A1 * | 10/2016 | Schertiger | A61F 5/451 |
| 2017/0156919 | A1 * | 6/2017 | Jepsen | A61F 5/4405 |
| 2018/0098877 | A1 * | 4/2018 | Pierson | A61F 5/4405 |
| 2020/0141504 | A1 | 5/2020 | Ochiai et al. | |
| 2022/0151816 | A1 * | 5/2022 | Allen | A61F 5/4405 |

FOREIGN PATENT DOCUMENTS

| | | |
|---|---|---|
| EP | 0153811 A1 | 9/1985 |
| GB | 1066058 A | 4/1967 |
| WO | 1990008525 A1 | 8/1990 |

OTHER PUBLICATIONS

Manfred Sauer, Bendi Bag, https://www.manfred-sauer.com/en/medical-devices/products/urine-collection-leg-bags/produkt///sauer-bendi-bag-with-fixed-adapter/ Accessed on Sep. 29, 2019.

Rusch, Belly Bag Urinary Collection Device, https://teleflex.com/usa/en/product-areas/urology/home-care/collection-devices/ Accessed on Sep. 29, 2019.

* cited by examiner

MEDICAL DEVICE ASSEMBLIES INCLUDING A VALVED DRAINAGE MEMBER

The present application is the U.S. National Stage Application of PCT Application No. PCT/US2021/042298, filed Jul. 20, 2021, which claims the benefit of and priority to U.S. Provisional Application No. 63/056,284, filed Jul. 24, 2020, all of which is hereby incorporated herein by reference.

BACKGROUND

Field of the Disclosure

The present disclosure generally relates to medical device assemblies. More particularly, the present disclosure relates to medical device assemblies including drainage members. Even more particularly, the present disclosure relates to medical device assemblies including valves for medical device assemblies including drainage members that prevent fluid from re-entering the drainage member and/or the medical device.

Description of Related Art

Certain medical devices, such as intermittent urinary catheters, are commonly used by those who suffer from various abnormalities of the urinary system, such as urinary incontinence. Urinary catheters generally comprise a shaft portion with two ends. A first end has a catheter tip that is inserted into a user's urethra. A second end generally has a drainage member that is used to help facilitate and direct urine drainage. The second end may drain into a urine collection bag.

During use, uncontrolled urine flow from the medical device, through the drainage member and into the collection bag may cause the bag to fill too quickly and may cause urine to back up into the drainage member. Accordingly, there is a need for an improved medical device assembly as shown and described herein.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a medical device assembly is disclosed. The assembly comprises a drainage member having a proximal end, a distal end, and a body defining a lumen extending therebetween. The lumen is in fluid communication with a medical device at the proximal end. The lumen is also in fluid communication with a collection container at the distal end. The drainage member body is attached to the collection container. The body includes a valve configured to control fluid flow between the drainage member and the collection container.

In another aspect, a drainage member for a medical device assembly is disclosed. The drainage member comprises a proximal end, a distal end, and a body defining a lumen therebetween. The lumen is configured to be in fluid communication with a medical device at the proximal end and is configured to be in fluid communication with a collection container at the distal end. The body is also configured to attach to the collection container and includes a valve configured to control fluid flow between the drainage member and the collection container.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figure 1:
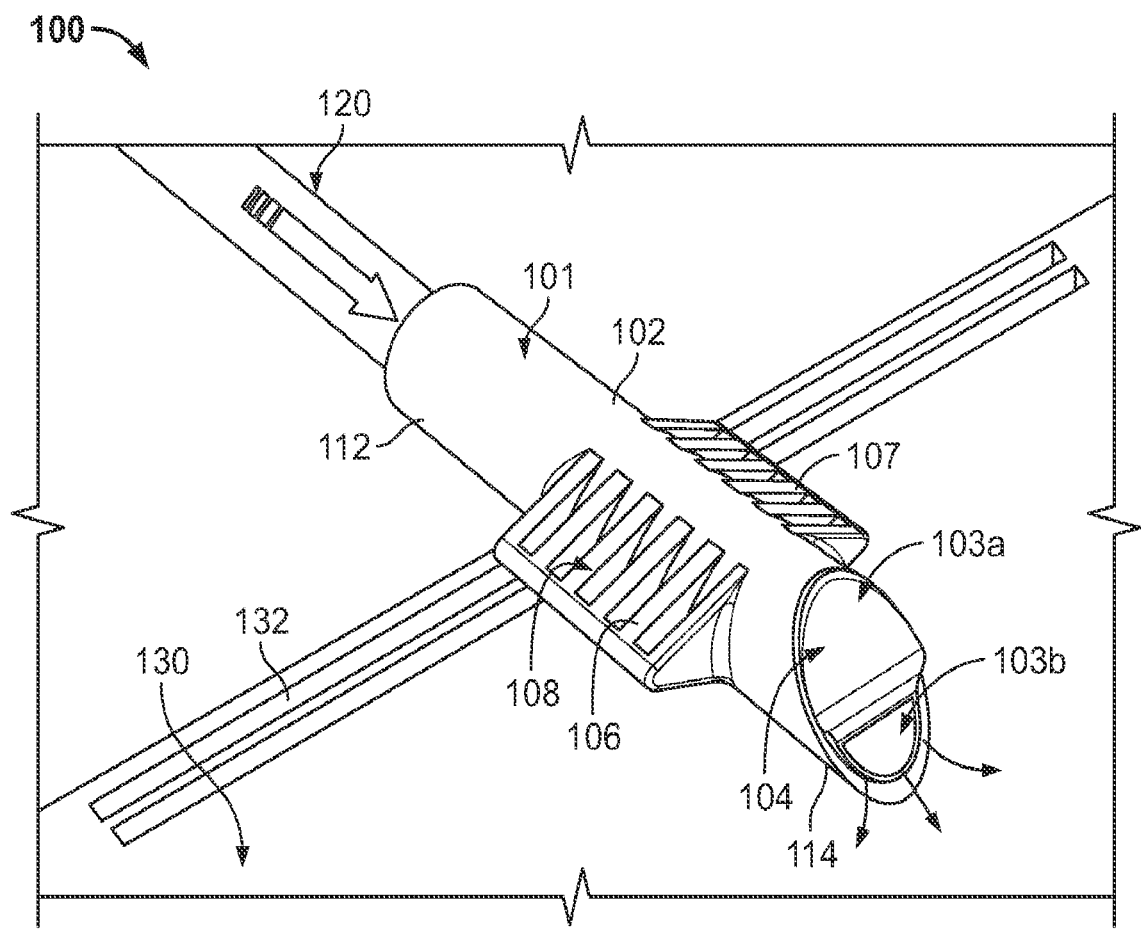
FIG. 1 is a partial perspective view of a urinary catheter assembly.
Figure 2:
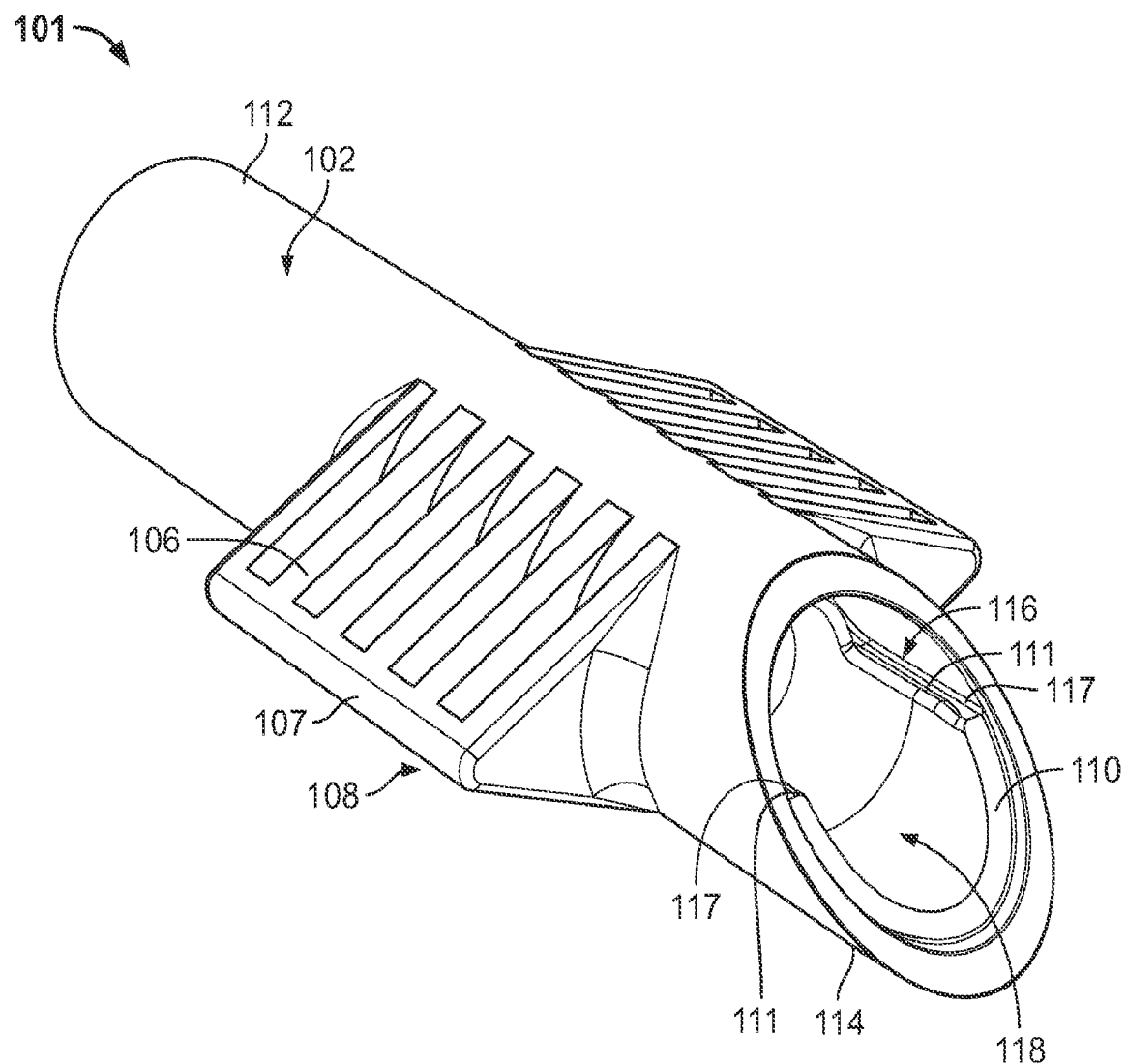
FIG. 2 is a perspective sectional view of a drainage member of the urinary catheter assembly of FIG. 1.

FIG. 1 illustrates an embodiment of a medical device assembly 100. In one embodiment, the assembly 100 includes a medical device 120, a collection container 130 and a drainage member 101. As shown in FIGS. 1-3, the drainage member 101 has a proximal end 112, a distal end 114, and a body 102 defining a lumen 118 extending therebetween. The lumen 118 is in fluid communication with a medical device 120 at the proximal end 112. The lumen 118 is also in fluid communication with a collection container 130 at the distal end 114. The drainage member body 102 is attached to the collection container 130. The distal end of the drainage member 102 may reside within the interior of the container 130. Fluid may flow from the medical device 120 through the drainage member 101 and into the collection container 130. As shown, the medical device 120 may be a urinary catheter. In alternative embodiments, the medical device may be a different tubular device, such as an intravenous catheter.

The drainage member body 102 may include at least one laterally extending portion or wing 108. The laterally extending portion 108 may be configured to be sealingly attached to the inner surface of a wall of the collection container 130. In the embodiment shown in FIGS. 1-2, the body 102 includes two laterally extending portions or wings 108, however in alternative embodiments, any other appropriate number of extending portions may be used. When viewed from the distal or proximal end of drainage member 101, the at least one wing may have a substantially triangular shape and be defined by downwardly sloping (from the tubular portion of body 102) and converging surfaces. In alternative embodiments, the at least one wing may have a different appropriate polygonal shape. In alternative embodiments the at least one wing may slope differently, such as at a different angle or may have no slope.

As shown in FIGS. 1-2 laterally extending portions or wings 108 may also include one or more spaced apart ribs 106. The one or more ribs 106 may be configured to sealingly engage with the collection container 130. As shown in FIGS. 1-2, the wings 108 include six ribs 106. In alternative embodiments any appropriate number of ribs and/or wings may be used. Ribs 106 provide a surface to which opposing walls of collection container 130 may be heat sealed. Other known sealing methods (e.g., adhesive) may also be used.

Figure 5:
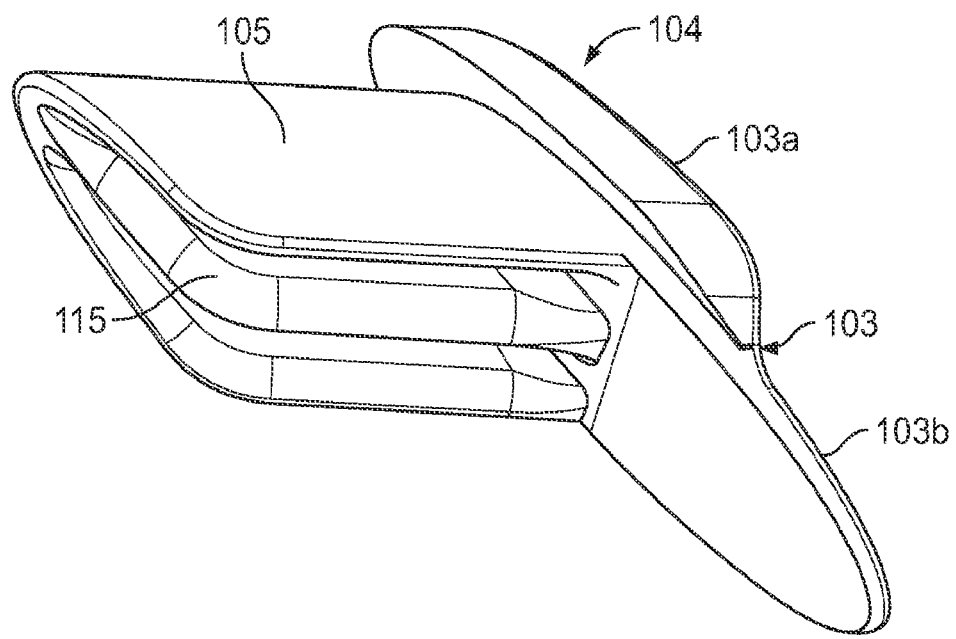
FIG. 5 is a side perspective view of the valve of FIG. 4.
Figure 6:
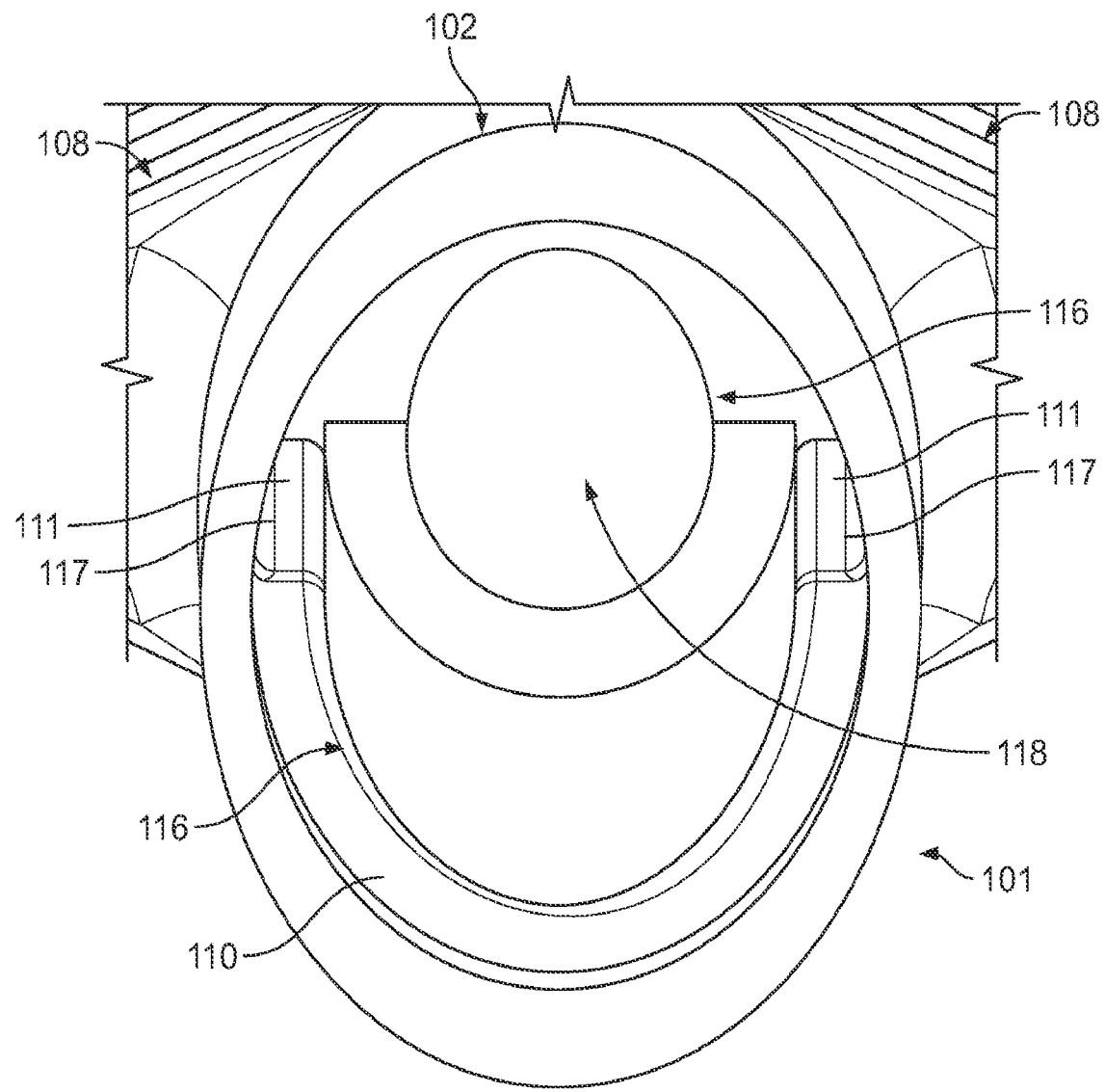
FIG. 6 is a front sectional view of the drainage member of FIG. 3A.

The drainage member 101 includes an inner surface 116. The inner surface 116 may be configured to receive at least a portion of a valve 104 (the valve is further shown and described in FIGS. 3A, 3B, 4, and 5). To receive the valve portion, the inner surface 116 may define a recess 111. As shown in FIGS. 2, 3B and 6, the inner surface 116 may have a ledge 117 that includes the recess 111. As shown in FIGS. 3A-5, the valve 104 may include a cover support member 105. The recess 111 may be configured to receive a portion of the cover support member 105.

Figure 3A:
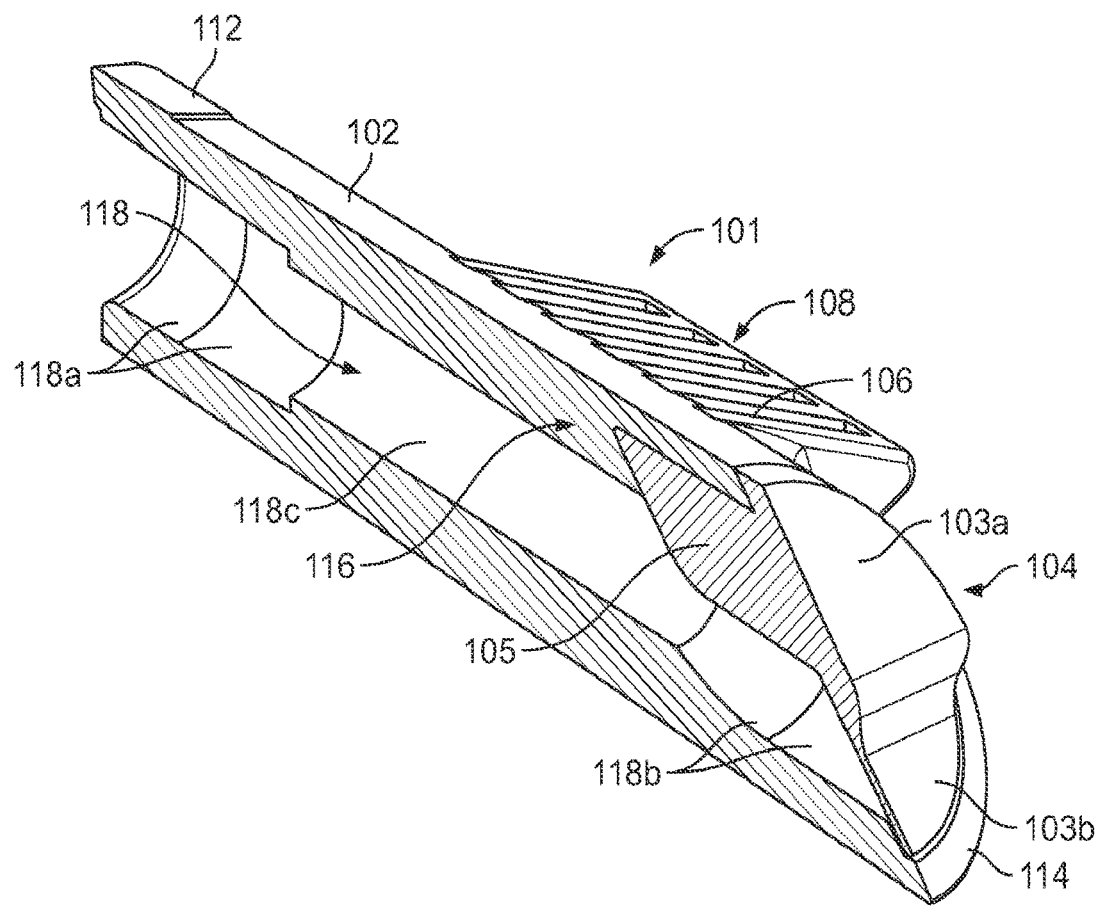
FIG. 3A is a cross-sectional view in perspective of the drainage member of FIG. 2, showing a valve attached to the drainage member.
Figure 3B:
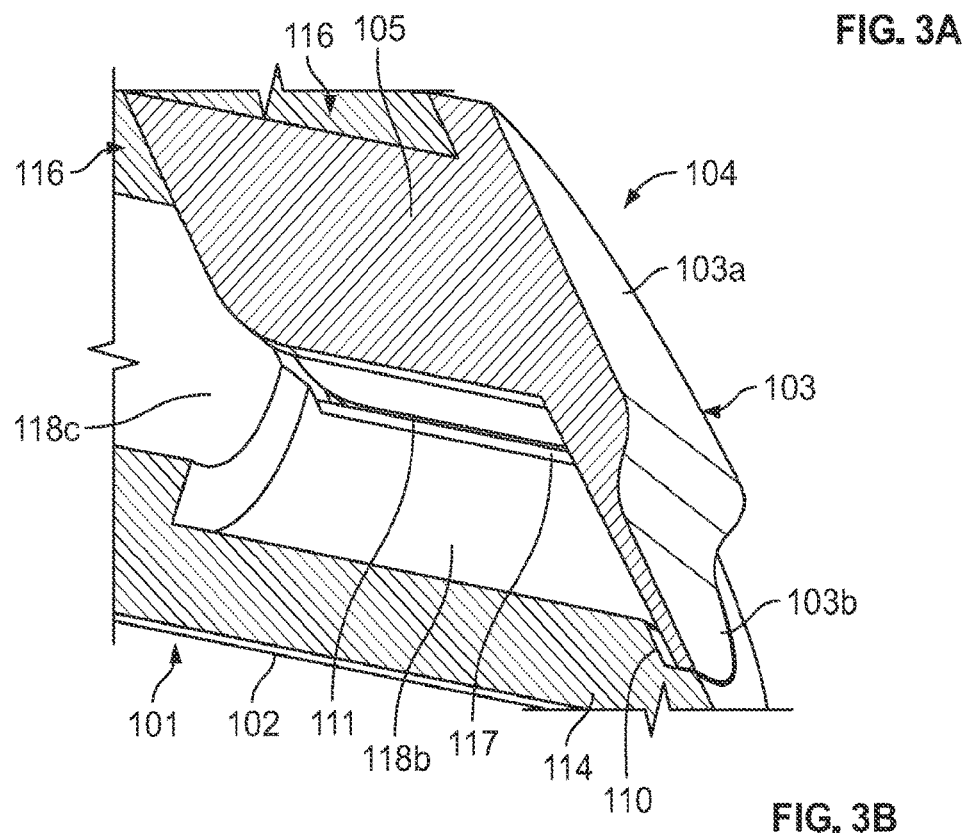
FIG. 3B is a close-up view of a distal portion of the drainage member of FIG. 3A.
Figure 4:
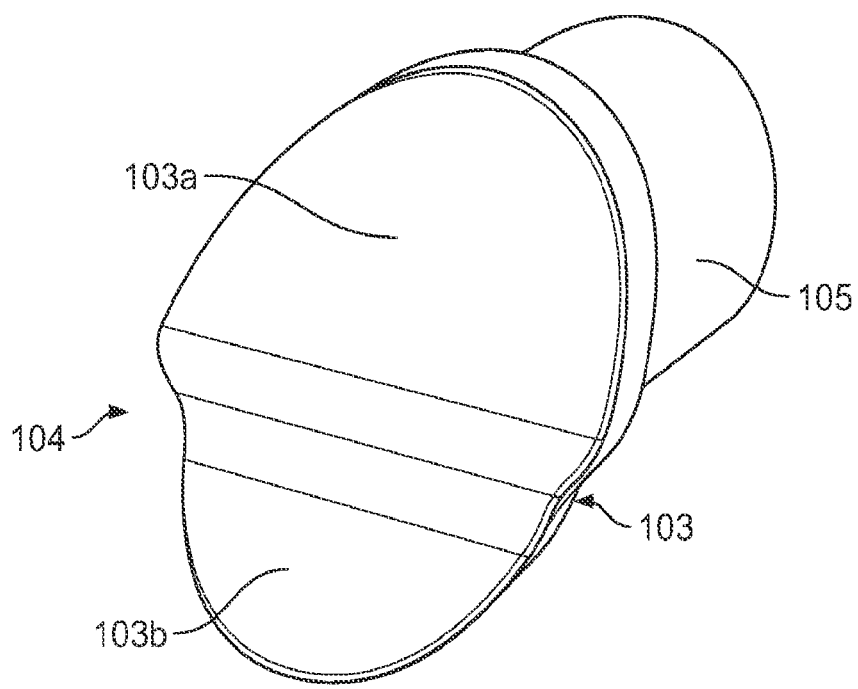
FIG. 4 is a front perspective view of the valve of FIG. 3A.

As shown in the embodiment of FIG. 3A, the body 102 may define a lumen 118 with a varying diameter such that the size of the lumen changes at least one portion of the drainage member 101. The varying diameter is shown at 118a, 118b, and 118c. The lumen at the proximal end of the body 102 is shown as 118a. In the embodiment shown in FIG. 3A, the proximal lumen 118a is configured to form a stop to receive the distal end of the medical device 120. The lumen at the distal end 114 of the body 102 is shown as 118b. As shown in FIGS. 3A and 3B, the distal lumen 118b is configured to receive the valve 104 and is configured to fluidly communicate with the collection container. The lumen at an intermediate portion of the body 102 is shown as 118c. The intermediate lumen 118c may be narrower than the distal lumen 118b and also may be narrower than the proximal lumen 118a. The intermediate lumen 118c allows fluid to flow from the proximal lumen 118a to the distal lumen 118b. The portions of the lumen 118 are in fluid communication and allow for fluid to flow from the medical device through the drainage member 101 and into the collection container. Any number of appropriate variations in lumen diameter may be used in alternative embodiments. For example, in some embodiments the lumen diameter may vary in any appropriate number of places throughout the lumen. In other embodiments the lumen may be of a uniform diameter.

FIGS. 3A, 3B, 4 and 5 show an embodiment of the valve 104. As shown, the valve 104 may be a unitary piece. In alternative embodiments, the valve may be made of multiple pieces. The valve 104 may include a cover member 103 including a rigid portion 103a and a flexible portion (flap) 103b. The cover member 103 may have varying thickness. In the embodiment shown, the rigid portion 103a is thicker than the flap 103b. In alternative embodiments any appropriate thickness configuration may be used, for example, the flap may be thicker than the rigid portion, or both portions may have the same thickness.

The valve 104 may be configured to control fluid flow between the drainage member 101 and the collection container 130. The flap 103b is configured to allow fluid to flow from the drainage member lumen 118 into the collection container 130. The valve 104 is also configured to prevent fluid from flowing from the collection container 130 into the drainage member lumen 118, as further described below.

The cover support member 105 may be formed as part of the rigid portion 103a. FIG. 5 shows an embodiment where the cover support member 105 has a spine 115. The spine 115 may provide stiffness to the valve 104 and may reside in the drainage member lumen 118. Engagement between the cover support member 105 and the recess 111 may be in the form of an interference fit between the valve 104 and the drainage member 101. As shown for example in FIG. 3A, the cover support member 105 also may contact the inner surface 116 outside of the recess 111, enhancing the interference fit. Alternatively, other ways of securing the valve 104 within the lumen 118 may be used, such as welding.

As shown in FIG. 6, the inner surface 116 of the drainage member 101 may include the ledge 117 and the recess 111. The recess 111 is configured to receive at least a portion of the cover support member 105. In the embodiment of FIG. 6, the recess 111 may be configured to receive the cover support member 105 in an interference fit, securing the valve to the drainage member 101.

The drainage member 101 may also include a valve seat 110. The valve seat 110 may be formed on the inner surface 116 of the drainage member 101. As shown in FIGS. 2 and 6, the valve seat 110 may be positioned at the distal end 114 of the drainage member 101. To prevent fluid from flowing back into the lumen 118 at least a portion of the valve 104 may contact the valve seat 110. In the embodiment shown in FIG. 1, the flap 103b rests on and contacts the valve seat 110. When fluid flows from the medical device 120 into the drainage member 101 and contacts the valve 104, the flap 103b moves such that an opening is created and urine flows through the opening into the collection container 130. If urine in the collection container 130 flows back toward the drainage member 101 and contacts the exterior surface of the valve 104, the force of the urine on the exterior of the valve 104 may push the flap 103b into contact with the valve seat 110. The contact between the flap 103b and the valve seat 110 prevents the flap from rotating past the valve seat 110, toward the drainage proximal end 112 and thereby prevents urine from flowing back into the drainage member 101.

Additionally, the fit between the cover support member 105 and the drainage member 101, as well as the thick structure of the rigid portion 103a, may allow the valve 104 to remain fixed and block flow, in the event that fluid from collection container attempts to re-enter drainage member 101.

In all embodiments described and in alternative embodiments at least one element of the assembly including: the drainage member body, laterally extending member, wings, ribs, and/or valves may be made of at least one of EPDM rubber, silicone and/or any suitable thermoplastic elastomers.

Other variations and combinations may also be employed without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A medical device assembly comprising a drainage member having a proximal end, a distal end, and a body defining a lumen extending therebetween, wherein said lumen includes a distal opening at the distal end of the drainage member and the lumen is in fluid communication with a medical device at the proximal end of the drainage member and a collection container at the distal end of the drainage member, wherein the drainage member body:
   is attached to an inner surface of the collection container; and
   includes a valve configured to control fluid flow between the drainage member and the collection container, wherein the valve comprises a cover member covering the distal opening and a cover support member received within a recess of the drainage member, the cover member including a varying thickness.

2. The assembly of claim 1, wherein the drainage member further includes a valve seat, the seat configured to limit movement of at least a portion of the valve.

3. The assembly of claim 2, wherein the valve comprises a rigid portion, a flexible portion, and a cover support member, the flexible portion being configured to allow fluid to flow from the drainage member lumen into the collection container and prevent fluid flow from the collection container into the drainage member lumen.

4. The assembly of claim 3, wherein the cover support member is attached to an interior surface of the drainage member.

5. The assembly of claim 4, wherein the valve seat is defined by the interior surface of the drainage member and includes a portion configured to contact the flexible portion of the valve such that movement of the flexible portion is limited by the contact with the portion of the valve seat.

6. The assembly of claim 1, wherein the body comprises at least one laterally extending portion configured to sealingly engage with a wall of the collection container.

7. The assembly of claim 6, wherein the at least one laterally extending portion comprises at least one rib, the at least one rib configured to sealingly engage with the collection container.

8. The assembly of claim 6, wherein the laterally extending portion includes at least one wing.

9. The assembly of claim 1, wherein the valve is a unitary piece.

10. The assembly of claim 1, wherein the medical device is a urinary catheter.

11. The assembly of claim 1, wherein said distal end of said drainage member resides within an interior of said container.

12. The assembly of claim 1, wherein the body defines a lumen with a varying diameter.

13. The assembly of claim 1, wherein at least one element of the assembly is made of at least one of EPDM rubber, silicone, and a thermoplastic elastomer.

14. A drainage member for a medical device assembly comprising a proximal end, a distal end, and a body defining a lumen extending therebetween, wherein the lumen includes a distal opening at the distal end of the drainage member and the lumen is configured to be in fluid communication with a medical device at the proximal end of the drainage member and is configured to be in fluid communication with a collection container at the distal end of the drainage member, wherein the drainage member body:
   is configured to attach to an inner surface of the collection container; and
   includes a valve configured to control fluid flow between the drainage member and the collection container, wherein the valve comprises a cover member covering the distal opening and a cover support member received within a recess of the drainage member, the cover member including a varying thickness.

15. The drainage member of claim 14 further including a valve seat configured to limit movement of at least a portion of the valve.

16. The drainage member of claim 15, wherein the valve comprises a rigid portion and a flexible portion, the flexible portion being configured to allow fluid to flow from the drainage member into the container and prevent fluid flow from the container into the drainage member lumen.

17. The drainage member of claim 16, wherein the valve seat is defined by an interior surface of the drainage member and includes a portion configured to contact the flexible portion of the valve, such that movement of the flexible portion is limited by the contact with the portion of the valve seat.

18. The drainage member of claim 14, wherein the body comprises at least one laterally extending portion configured to sealingly engage with the collection container.

19. The drainage member of claim 18, wherein the at least one laterally extending portion comprises at least one rib, the at least one rib configured to sealingly engage with the collection container.

* * * * *